(12) United States Patent
Huang et al.

(10) Patent No.: US 12,513,673 B2
(45) Date of Patent: Dec. 30, 2025

(54) BACKSCATTER COMMUNICATION METHOD AND APPARATUS

(71) Applicant: HUAWEI TECHNOLOGIES CO., LTD., Guangdong (CN)

(72) Inventors: Huang Huang, Shenzhen (CN); Hua Shao, Shenzhen (CN); Mao Yan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 505 days.

(21) Appl. No.: 17/674,911

(22) Filed: Feb. 18, 2022

(65) Prior Publication Data

US 2022/0174676 A1 Jun. 2, 2022

Related U.S. Application Data

(63) Continuation of application No. PCT/CN2020/110170, filed on Aug. 20, 2020.

(30) Foreign Application Priority Data

Aug. 21, 2019 (CN) .......................... 201910772486.3

(51) Int. Cl.
*H04W 72/0453* (2023.01)
*H04L 5/00* (2006.01)

(52) U.S. Cl.
CPC ....... *H04W 72/0453* (2013.01); *H04L 5/0055* (2013.01)

(58) Field of Classification Search
CPC ... H04W 72/0453; H04W 4/80; H04W 72/53; H04L 5/0055; H04B 5/77; G06K 7/10019; G06K 7/10069
USPC .......................................................... 370/329
See application file for complete search history.

(56) References Cited

U.S. PATENT DOCUMENTS

| | | | | |
|---|---|---|---|---|
| 6,766,514 | B1 * | 7/2004 | Moore | ................... G06F 8/447 717/145 |
| 2005/0052279 | A1 | 3/2005 | Bridgelall | |
| 2008/0007436 | A1 * | 1/2008 | Banwait | ............. H03M 7/4006 341/51 |
| 2010/0141273 | A1 * | 6/2010 | Potyrailo | ........... G06K 19/0716 324/655 |

(Continued)

FOREIGN PATENT DOCUMENTS

| CN | 201654821 U | 11/2010 |
|---|---|---|
| CN | 105303137 A | 2/2016 |

(Continued)

OTHER PUBLICATIONS

Office Action dated Jun. 1, 2023 issued for Chinese Application No. 201910772486.3 (48 pages).

(Continued)

*Primary Examiner* — Thuong Nguyen

(57) ABSTRACT

A backscatter communication method and apparatus provides operation including: receiving a first excitation signal from a first device; determining a first resource based on a candidate resource; and sending a backscattered signal of the first excitation signal to a second device based on the first resource. This can reduce a probability of selecting a same resource as another device to some extent, so that a conflict is reduced, and an access success rate of a backscatter device can be improved.

18 Claims, 6 Drawing Sheets

(56) References Cited

U.S. PATENT DOCUMENTS

| | | | | |
|---|---|---|---|---|
| 2011/0274426 | A1* | 11/2011 | Yang | H04J 3/1694 |
| | | | | 398/16 |
| 2012/0235799 | A1 | 9/2012 | Yamasaki | |
| 2015/0030108 | A1* | 1/2015 | Chae | H04L 27/2684 |
| | | | | 375/344 |
| 2016/0169673 | A1* | 6/2016 | Saito | G01C 17/38 |
| | | | | 702/92 |
| 2016/0174125 | A1* | 6/2016 | Kobayashi | H04W 36/302 |
| | | | | 370/332 |
| 2016/0372916 | A1* | 12/2016 | Sawko | H02H 3/006 |
| 2017/0082729 | A1 | 3/2017 | Bar-Shalom | |
| 2018/0149746 | A1* | 5/2018 | Leskiw | G01S 15/8959 |
| 2018/0192409 | A1* | 7/2018 | Yang | H04W 72/044 |
| 2018/0295651 | A1* | 10/2018 | Cao | H04W 72/23 |
| 2019/0072777 | A1* | 3/2019 | Okada | G02B 27/646 |
| 2019/0274144 | A1* | 9/2019 | Zhang | H04B 7/22 |
| 2019/0349142 | A1* | 11/2019 | Aiba | H04L 1/1819 |
| 2020/0128541 | A1* | 4/2020 | Zhang | H04L 5/0044 |
| 2021/0051646 | A1* | 2/2021 | Maaref | H04W 72/02 |
| 2021/0271833 | A1* | 9/2021 | Sheng | G06K 7/10297 |
| 2021/0298025 | A1* | 9/2021 | Wang | H04W 72/53 |
| 2022/0094488 | A1* | 3/2022 | Matsumura | H04L 5/0032 |
| 2022/0174676 | A1* | 6/2022 | Huang | G06K 7/10069 |

FOREIGN PATENT DOCUMENTS

| | | |
|---|---|---|
| CN | 105684371 A | 6/2016 |
| CN | 106664510 A | 5/2017 |
| CN | 109194364 A | 1/2019 |
| CN | 109451430 A | 3/2019 |
| WO | 2010027980 A1 | 3/2010 |

OTHER PUBLICATIONS

Partial Supplementary European Search Report dated Sep. 16, 2022 issued for European Application No. 20854846.1 (11 pages).

Nguyen Van Huynh et al., Ambient Backscatter Communications: A Contemporary Survey. IEEE Communications Surveys and Tutorials, vol. 20, No. 4, May 29, 2018, 34 pages.

Li Ertao, Energy-Efficient Transmission Schemes with Implementation for Radio-Frequency Powered Wireless Networks. Zhejiang University of Technology, Jan. 2019, 109 pages.

International Search Report and Written Opinion issued in PCT/CN2020/110170, dated Nov. 26, 2020, 8 pages.

Communication pursuant to Article 94(3) EPC dated Nov. 12, 2024, issued for European Application No. 20 854 846.1 (5 pages).

* cited by examiner

BACKSCATTER COMMUNICATION METHOD AND APPARATUS

CROSS-REFERENCE TO RELATED APPLICATIONS

This application is a continuation of International Application No. PCT/CN2020/110170, filed on Aug. 20, 2020, which claims priority to Chinese Patent Application No. 201910772486.3, filed on Aug. 21, 2019. The disclosures of the aforementioned applications are hereby incorporated by reference in their entireties.

TECHNICAL FIELD

This disclosure relates to the communications field, and more specifically, to a backscatter communication method and apparatus in the communications field.

BACKGROUND

A backscatter communication technology is applicable to passive communication of the internet of things, and has advantages such as extremely low power consumption and extremely low costs. A principle of backscatter communication is as follows: An exciter sends an excitation signal to a receiver and a backscatter device. The backscatter device modulates, by using the excitation signal, data that needs to be sent to obtain a backscattered signal, and sends the backscattered signal to the receiver. The receiver obtains, through demodulation by using the excitation signal sent by the exciter and the backscattered signal, data that is carried on the backscattered signal and that is sent by the backscatter device.

Specifically, the exciter sends the excitation signal to the backscatter device on a frequency $f_c$. The backscatter device sends the backscattered signal to the receiver on a frequency $f_c + \Delta f$. If there are a plurality of backscatter devices, frequencies on which the plurality of backscatter devices send backscattered signals are $f_c + \Delta f$. In this case, if the plurality of backscatter devices send the backscattered signals at a same moment, the receiver cannot recognize the plurality of backscatter devices, causing an access failure of the backscatter device and affecting an access success rate of the backscatter device.

SUMMARY

This disclosure provides a backscatter communication method and apparatus, to reduce a conflict, so that an access success rate of a backscatter device can be improved.

According to a first aspect, a backscatter communication method is provided. The method includes: receiving a first excitation signal from a first device; determining a first resource based on a candidate resource; and sending a backscattered signal of the first excitation signal to a second device based on the first resource.

Therefore, according to the backscatter communication method provided in this disclosure, after the first excitation signal is received, the backscattered signal of the first excitation signal is sent to the second device based on the first resource determined based on the candidate resource, so that a probability of selecting a same resource as another device can be reduced to some extent, thereby reducing a conflict and improving an access success rate of a backscatter device.

In some possible implementations, the candidate resource is a frequency domain resource.

In some possible implementations, the first resource is determined based on a first offset step and a first factor.

In some possible implementations, the first offset step is included in a candidate offset step, and the candidate resource includes the candidate offset step, so that a probability that different backscatter devices select a same offset step can be reduced. The first factor for determining the first resource may be a default value or a preset value.

In some possible implementations, the first factor is included in a candidate factor, and the candidate resource includes the candidate factor, so that a probability that different backscatter devices select a same factor can be reduced. The first offset step for determining the first resource may be a default value or a preset value.

In some possible implementations, the first offset step is included in a candidate offset step, the first factor is included in a candidate factor, and the candidate resource includes the candidate offset step and the candidate factor, so that a probability that different backscatter devices select a same offset step and/or a same factor can be reduced.

In some possible implementations, the determining a first resource based on a candidate resource includes: selecting the first resource from candidate resources, where each one of the candidate resources is determined based on one offset step and one factor.

In some possible implementations, the first offset step is a frequency offset step, and the frequency offset step is greater than or equal to bandwidth of the first excitation signal. In this case, sending the backscattered signal by the backscatter device on a resource obtained by offsetting, by the first resource, a resource on which the first excitation signal is received can avoid a conflict with sending a backscattered signal by another backscatter device.

Optionally, any one of candidate offset steps is greater than the bandwidth of the first excitation signal. In this case, when different backscatter devices receive the first excitation signal on a same frequency, the backscatter devices may select different offset steps from the candidate offset steps, and the offset steps are greater than the bandwidth of the first excitation signal. Resources on which different backscatter devices send backscattered signals may be staggered in frequency domain, to avoid spectrum aliasing, thereby avoiding a conflict.

In some possible implementations, the first excitation signal is a pseudo-random signal, and the pseudo-random signal may occupy specific bandwidth. This helps a receiver to perform detection. In addition, bandwidth of the pseudo-random signal may be constrained, and bandwidth of the backscattered signal of the first excitation signal may be further constrained, so that it can be ensured that a backscatter communication system does not affect another communications system.

In some possible implementations, the method further includes: receiving clock information from the first device; optionally adjusting a clock based on the clock information; and optionally sending a backscattered signal of a third excitation signal based on an adjusted clock, where the third excitation signal is from the first device, in other words, sending the next backscattered signal based on the adjusted clock.

In some possible implementations, the method further includes: receiving a first resource configuration from the first device; receiving a second excitation signal from the first device, and sending a first identifier of a third device to the second device on a resource indicated by the first resource configuration; and receiving an access acknowledgment message from the first device, where the access acknowledgment message includes a second identifier allocated to the third device by the first device or the second device.

In some possible implementations, the receiving a first resource configuration from the first device includes: receiving, from the first device, the first resource configuration sent by the second device; and the receiving an access acknowledgment message from the first device includes: receiving, from the first device, the access acknowledgment message sent by the second device.

In some possible implementations, the first excitation signal is a pseudo-random signal, and the second excitation signal is a monophonic signal.

In some possible implementations, the first excitation signal is a pseudo-random signal, and the second excitation signal is a pseudo-random signal.

In some possible implementations, the method further includes: receiving a second resource configuration from the first device, where the second resource configuration is used to indicate the candidate resource.

In some possible implementations, the receiving a second resource configuration from the first device includes: receiving, from the first device, the second resource configuration sent by the second device.

In some possible implementations, the first device is an exciter, the second device is a receiver, and the third device is a backscatter device.

According to a second aspect, a backscatter communication method is provided. The method includes: receiving a backscattered signal that is of a first excitation signal and that is sent by a third device based on a first resource, where the first resource is determined based on a candidate resource.

In some possible implementations, the receiving a backscattered signal that is of a first excitation signal and that is sent by a third device based on a first resource includes: receiving, on a second resource, the backscattered signal that is of the first excitation signal and that is sent by the third device based on the first resource.

In some possible implementations, the first resource is determined based on a first offset step and a first factor. The first offset step is included in a candidate offset step, and the candidate resource includes the candidate offset step; and/or the first factor is included in a candidate factor, and the candidate resource includes the candidate factor.

In some possible implementations, the first offset step is a frequency offset step, and the frequency offset step is greater than or equal to bandwidth of the first excitation signal.

In some possible implementations, the method further includes: sending clock information to the third device.

In some possible implementations, because the second resource on which the backscattered signal is received is not far from a sending resource on which the backscattered signal is sent, it may be determined, based on the second resource, that the sending resource on which the backscattered signal is sent should be a third resource obtained by offsetting a resource of the first excitation signal by the first resource, and the clock information of a backscatter device may be determined based on the third resource and the second resource on which the backscattered signal is actually received.

In some possible implementations, the sending the clock information to the third device includes: sending the clock information to the third device by using a first device.

In some possible implementations, the method further includes: sending a first resource configuration to the third device, where the first resource configuration is used by the third device to send a first identifier.

In some possible implementations, the sending a first resource configuration to the third device includes: sending the first resource configuration to the third device by using the first device; and the method further includes: receiving, on a resource indicated by the first resource configuration, the first identifier of the third device that is sent by the third device; and sending an access acknowledgment message to the third device by using the first device, where the access acknowledgment message includes a second identifier allocated to the third device by a second device.

Optionally, the access acknowledgment message includes an ACK.

In some possible implementations, the method further includes: sending the first resource configuration to a second device, so that the second device receives, on a resource indicated by the first resource configuration, the first identifier of the third device that is sent by the third device; receiving the first identifier of the backscatter terminal that is sent by the second device; and sending an access acknowledgment message to the third device, where the access acknowledgment message includes a second identifier allocated to the third device by the first device.

In some possible implementations, before the receiving a backscattered signal that is of a first excitation signal and that is sent by a third device based on a first resource, the method further includes: sending the first excitation signal to the third device, where the first excitation signal is a pseudo-random signal.

In some possible implementations, before the receiving a backscattered signal that is of a first excitation signal and that is sent by a third device based on a first resource, the method further includes: sending a second resource configuration to the third device, where the second resource configuration is used to indicate the candidate resource.

According to a third aspect, a backscatter communication method is provided. The method includes: receiving, based on a first resource, a backscattered signal that is of a first excitation signal and that is sent by a third device, where the first resource is determined based on a candidate resource; and sending first receiving resource information of the backscattered signal to a first device.

Optionally, the first receiving resource information includes an event that the backscattered signal that is of the first excitation signal and that is sent by the third device is received on a second resource.

Optionally, the first receiving resource information may further include clock information of the third device.

In some possible implementations, a first offset step is included in a candidate offset step, and the candidate resource includes the candidate offset step; and/or a first factor is included in a candidate factor, and the candidate resource includes the candidate factor.

In some possible implementations, the first offset step is a frequency offset step, and the frequency offset step is greater than or equal to bandwidth of the first excitation signal.

In some possible implementations, the method further includes: receiving a first resource configuration sent by the first device; receiving, on a resource indicated by the first resource configuration, a first identifier of the third device that is sent by the third device; and sending the first identifier of the third device to the first device.

In some possible implementations, because the second resource on which the backscattered signal is received is not far from a sending resource on which the backscattered signal is sent, it may be determined, based on the second resource, that the sending resource on which the backscattered signal is sent should be a third resource obtained by offsetting a resource of the first excitation signal by the first resource, and the clock information of a backscatter device may be determined based on the third resource and the second resource on which the backscattered signal is actually received.

In some possible implementations, the method further includes: receiving the first excitation signal sent by the first device; and receiving a second excitation signal sent by a fourth device, where the first excitation signal and the second excitation signal are pseudo-random signals, and a pseudo-random sequence of the first excitation signal is different from a pseudo-random sequence of the second excitation signal, and/or a time-frequency resource occupied by the first excitation signal is different from a time-frequency resource occupied by the second excitation signal.

Optionally, the first device may be a first exciter, and the fourth device is a second exciter. If different exciters send excitation signals on a same time-frequency resource by using a same pseudo-random sequence, a backscattered signal of a backscatter device covered by the first exciter causes interference to detection of a backscattered signal of a backscatter device covered by the second exciter. Therefore, sending different excitation signals by different exciters can reduce excitation signal interference. In addition, if the first exciter and the second exciter send excitation signals on a same time-frequency resource by using a same pseudo-random sequence, the second device cannot determine, through recognition, a backscatter device falls within a coverage area of which exciter. Therefore, sending different excitation signals by different exciters can also enable the second device to better determine, through recognition, a backscatter device falls within a coverage area of which exciter.

According to a fourth aspect, a backscatter communication method is provided. The method includes: sending a first excitation signal to a third device, where the first excitation signal is a pseudo-random signal; receiving a first resource configuration sent by a second device, where the first resource configuration is used to transmit a first identifier of the third device; and sending the first resource configuration to the third device.

In some possible implementations, after the sending the first resource configuration to the third device, the method further includes:

sending a second excitation signal to the third device, where the second excitation signal is used to encourage the third device to send the first identifier of the third device to a first device on a resource indicated by the first resource configuration.

In some possible implementations, the first excitation signal is a pseudo-random signal, and the second excitation signal is a pseudo-random signal.

In some possible implementations, the first excitation signal is a pseudo-random signal, and the second excitation signal is a monophonic signal.

In some possible implementations, the method further includes: receiving clock information sent by the second device; and sending the clock information to the third device.

In some possible implementations, the method further includes: receiving a second resource configuration sent by the first device, where the second resource configuration is used to indicate a candidate resource; and sending the second resource configuration to the third device.

According to a fifth aspect, this disclosure provides a backscatter communication apparatus, configured to implement the method according to any one of the first aspect and/or the possible implementations of the first aspect. The apparatus may be a third device, may be an apparatus in the third device, or may be an apparatus that can be used together with the third device. For example, the third device is a backscatter device. In an example embodiment, the apparatus may include a corresponding module for performing the method/operation/step/action described in the first aspect and/or any possible implementation of the first aspect. The module may be a hardware circuit, may be software, or may be implemented by a hardware circuit in combination with software. In an example embodiment, the apparatus may include a processing unit and a transceiver unit.

According to a sixth aspect, this disclosure provides a backscatter communication apparatus, configured to implement the method according to any one of the second aspect and/or the possible implementations of the second aspect. The apparatus may be a first device or a second device, may be an apparatus in the first device or the second device, or may be an apparatus that can be used together with the first device or the second device. For example, the first device is an exciter, and the second device is a receiver. In an example embodiment, the apparatus may include a corresponding module for performing the method/operation/step/action described in the second aspect and/or any possible implementation of the second aspect. The module may be a hardware circuit, may be software, or may be implemented by a combination of a hardware circuit and software. In an example embodiment, the apparatus may include a receiving unit.

According to a seventh aspect, this disclosure provides a backscatter communication apparatus, configured to implement the method according to any one of the third aspect and/or the possible implementations of the third aspect. The apparatus may be a second device, may be an apparatus in the second device, or may be an apparatus that can be used together with the second device. For example, the second device is a receiver. In an example embodiment, the apparatus may include a corresponding module for performing the method/operation/step/action described in the third aspect and/or any possible implementation of the third aspect. The module may be a hardware circuit, may be software, or may be implemented by a combination of a hardware circuit and software. In an example embodiment, the apparatus may include a receiving unit and a sending unit.

According to an eighth aspect, this disclosure provides a backscatter communication apparatus, configured to implement the method according to any one of the fourth aspect and/or the possible implementations of the fourth aspect. The apparatus may be a first device, may be an apparatus in the first device, or may be an apparatus that can be used together with the first device. For example, the first device is an exciter. In an example embodiment, the apparatus may include a corresponding module for performing the method/operation/step/action described in the fourth aspect and/or any possible implementation of the fourth aspect. The module may be a hardware circuit, may be software, or may be implemented by a combination of a hardware circuit and software. In an example embodiment, the apparatus may include a sending unit and a receiving unit.

According to a ninth aspect, this disclosure provides a backscatter communication apparatus. The apparatus includes a processor, configured to implement the method according to any one of the first aspect and/or the possible implementations of the first aspect. The apparatus may further include a memory, the memory is coupled to the processor, and the processor is configured to implement the method according to any one of the first aspect and/or the possible implementations of the first aspect. Optionally, the processor is configured to store instructions, and when executing the instructions stored in the memory, the processor may implement the method according to any one of the first aspect and/or the possible implementations of the first aspect. The apparatus may further include a communications interface. The communications interface is used by the apparatus to communicate with another device. For example, the communications interface may be a transceiver, a circuit, a bus, a module, a pin, or another type of communications interface.

According to a tenth aspect, this disclosure provides a backscatter communication apparatus. The apparatus includes a processor, configured to implement the method according to any one of the second aspect and/or the possible implementations of the second aspect. The apparatus may further include a memory, the memory is coupled to the processor, and the processor is configured to implement the method according to any one of the second aspect and/or the possible implementations of the second aspect. Optionally, the processor is configured to store instructions, and when executing the instructions stored in the memory, the processor may implement the method according to any one of the second aspect and/or the possible implementations of the second aspect. The apparatus may further include a communications interface, and the communications interface is used by the apparatus to communicate with another device.

According to an eleventh aspect, this disclosure provides a backscatter communication apparatus. The apparatus includes a processor, configured to implement the method according to any one of the third aspect and/or the possible implementations of the third aspect. The apparatus may further include a memory, the memory is coupled to the processor, and the processor is configured to implement the method according to any one of the third aspect and/or the possible implementations of the third aspect. Optionally, the processor is configured to store instructions, and when executing the instructions stored in the memory, the processor may implement the method according to any one of the third aspect and/or the possible implementations of the third aspect. The apparatus may further include a communications interface. The communications interface is used by the apparatus to communicate with another device. For example, the communications interface may be a transceiver, a circuit, a bus, a module, a pin, or another type of communications interface.

According to a twelfth aspect, this disclosure provides a backscatter communication apparatus. The apparatus includes a processor, configured to implement the method according to any one of the fourth aspect and/or the possible implementations of the fourth aspect. The apparatus may further include a memory, the memory is coupled to the processor, and the processor is configured to implement the method according to any one of the fourth aspect and/or the possible implementations of the fourth aspect. Optionally, the processor is configured to store instructions, and when executing the instructions stored in the memory, the processor may implement the method according to any one of the fourth aspect and/or the possible implementations of the fourth aspect. The apparatus may further include a communications interface, and the communications interface is used by the apparatus to communicate with another device.

According to a thirteenth aspect, this disclosure provides a backscatter communication system. The system includes at least two of the apparatus provided in the fifth aspect, the apparatus provided in the sixth aspect, the apparatus provided in the seventh aspect, and the apparatus provided in the eighth aspect; or the system includes at least two of the apparatus provided in the ninth aspect, the apparatus provided in the tenth aspect, the apparatus provided in the eleventh aspect, and the apparatus provided in the twelfth aspect.

According to a fourteenth aspect, this disclosure provides a computer-readable storage medium. The computer-readable storage medium stores computer instructions. When the computer instructions are run on a computer, the computer is enabled to perform the method according to any one of the first aspect and the possible designs of the first aspect.

According to a fifteenth aspect, this disclosure provides a computer-readable storage medium. The computer-readable storage medium stores computer instructions. When the computer instructions are run on a computer, the computer is enabled to perform the method according to any one of the second aspect and the possible designs of the second aspect.

According to a sixteenth aspect, this disclosure provides a computer-readable storage medium. The computer-readable storage medium stores computer instructions. When the computer instructions are run on a computer, the computer is enabled to perform the method according to any one of the third aspect and the possible designs of the third aspect.

According to a seventeenth aspect, this disclosure provides a computer-readable storage medium. The computer-readable storage medium stores computer instructions. When the computer instructions are run on a computer, the computer is enabled to perform the method according to any one of the fourth aspect and the possible designs of the fourth aspect.

According to an eighteenth aspect, this disclosure provides a chip, including a processor. The processor is configured to perform the method in any one of the first aspect and the possible implementations of the first aspect.

Optionally, the chip further includes a memory, and the memory is coupled to the processor.

Further, optionally, the chip further includes a communications interface.

According to a nineteenth aspect, this disclosure provides a chip, including a processor. The processor is configured to perform the method in any one of the second aspect and the possible implementations of the second aspect.

Optionally, the chip further includes a memory, and the memory is coupled to the processor.

Further, optionally, the chip further includes a communications interface.

According to a twentieth aspect, this disclosure provides a chip, including a processor. The processor is configured to perform the method in any one of the third aspect and the possible implementations of the third aspect.

Optionally, the chip further includes a memory, and the memory is coupled to the processor.

Further, optionally, the chip further includes a communications interface.

According to a twenty-first aspect, this disclosure provides a chip, including a processor. The processor is configured to perform the method in any one of the fourth aspect and the possible implementations of the fourth aspect.

Optionally, the chip further includes a memory, and the memory is coupled to the processor.

Further, optionally, the chip further includes a communications interface.

According to a twenty-second aspect, this disclosure provides a computer program product. The computer program product includes computer program code. When the computer program code is run on a computer, the computer is enabled to perform the method according to any one of the first aspect and the possible designs of the first aspect.

According to a twenty-third aspect, this disclosure provides a computer program product. The computer program product includes computer program code. When the computer program code is run on a computer, the computer is enabled to perform the method according to any one of the second aspect or the possible implementations of the second aspect.

According to a twenty-fourth aspect, this disclosure provides a computer program product. The computer program product includes computer program code. When the computer program code is run on a computer, the computer is enabled to perform the method according to any one of the third aspect and the possible designs of the third aspect.

According to a twenty-fifth aspect, this disclosure provides a computer program product. The computer program product includes computer program code. When the computer program code is run on a computer, the computer is enabled to perform the method according to any one of the fourth aspect and the possible implementations of the fourth aspect.

DESCRIPTION OF EMBODIMENTS

The following describes technical solutions of this disclosure with reference to accompanying drawings.

Figure 1:
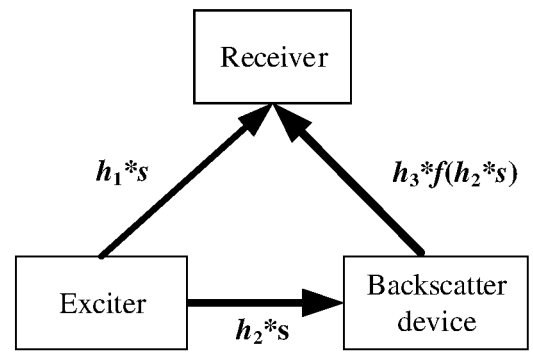
FIG. 1 is a schematic diagram of a backscatter communication scenario according to an embodiment of this disclosure.

FIG. 1 is a schematic diagram of a backscatter communication scenario according to an embodiment of this disclosure. Backscatter communication is a passive communications technology that has extremely low power consumption and extremely low costs and that is applicable to an internet of things application. Backscatter communication may also be referred to as passive communication and ambient communication. Typical backscatter communication is shown in FIG. 1. There are three nodes: an exciter, a backscatter device (BD), and a receiver. The exciter sends a radio signal s. The radio signal s is also referred to as an excitation signal. The receiver receives a radio signal $h_1*s$ obtained after convolution is performed on the radio signal s and a channel $h_1$. The backscatter device receives a radio signal (namely, a radio signal $(h_2*s)$ obtained after convolution is performed on the radio signal s and a channel $h_2$) of the exciter, and backscatters the signal to the receiver. During backscattering, the backscatter device adds a signal of the backscatter device to the backscattered signal, in other words, modulates the received signal $h_2*s$ by using a function $f(x)$. The receiver receives a radio signal $h_3*f(h_2*s)$ obtained after convolution is performed on the signal $h_2*s$ and a channel $h_3$, and obtains, through demodulation, the data carried on the backscattered signal.

The exciter may be referred to as a helper, an interrogator, a reader, user equipment (UE), an excitation source, or the like. A specific name of the exciter is not limited in the embodiments of this disclosure. The exciter is used as an example for description in the embodiments of this disclosure.

The backscatter device may also be referred to as a backscatter terminal, a passive device, a semi-passive device, an ambient signal device, a tag, and the like. A specific name of the backscatter device is not limited in the embodiments of this disclosure. The backscatter device is used as an example for description in the embodiments of this disclosure.

FIG. 1 is only a typical backscatter communication scenario. In an actual application, the exciter and the receiver may be located on one node, and in this case, communication is performed between two nodes.

Figure 2:
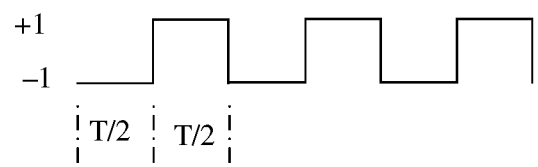
FIG. 2 is a schematic diagram of a square wave signal according to an embodiment of this disclosure.
Figure 3:
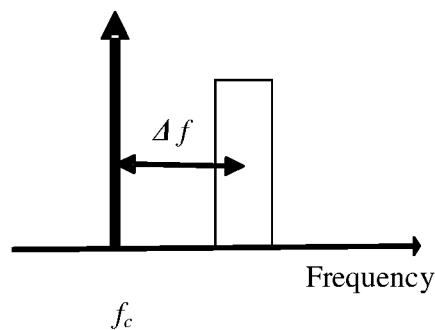
FIG. 3 is a schematic diagram of spectrum shifting according to an embodiment of this disclosure.

The backscatter device performs a limited quantity of times of amplitude and/or phase modulation on the received excitation signal, in other words, changes amplitude and/or a phase of $h_2*s$ by using the function $f(h_2*s)$. For example, if the excitation signal is a monophonic signal of a frequency fc (which is a line spectrum of fc in terms of frequency), when the backscatter device modulates the received signal $h_2*s$, $f(h_2*s)=h_2*s$ or $f(h_2*s)=-h_2*s$ (namely, modulation with a phase of 0 or modulation with a phase of 180 degrees); or $f(h_2*s)=h_2*s$ or $f(h_2*s)=0$ (namely, backscattering modulation or non-backscattering modulation). For example, if modulation input is $h_2*s$ in a period T, after modulation is performed, in time domain, $f(h_2*s)=h_2*s$ is output for T/2 time (or any other time that is less than T), and $f(h_2*s)=-h_2*s$ is output for the other T/2 time (or correspondingly, remaining time in the time T). The backscatter device modulates the received signal $h_2*s$, which is equivalent to superimposing a square wave signal whose period is T on the received signal $h_2*s$ (where the square wave signal is shown in FIG. 2). In frequency domain, the backscattered signal obtained through modulation is equivalent to shifting a spectrum of the excitation signal by $\Delta f=1/T$, and the spectrum is shown in FIG. 3. To be specific, the exciter sends the excitation signal to the backscatter device on a frequency $f_c$. The backscatter device sends the backscattered signal to the receiver on a frequency $f_c+\Delta f$. If there are a plurality of backscatter devices, frequencies on which the plurality of backscatter devices send backscattered signals are $f_c\backslash f$. In this case, if the plurality of backscatter devices send the backscattered signals at a same moment, the receiver cannot recognize the plurality of backscatter devices, causing an access failure of the backscatter device and affecting an access success rate of the backscatter device. Consequently, the backscatter device cannot communicate.

With reference to an example, the following describes the backscatter communication method provided in the embodiments of this disclosure. In the embodiments of this disclosure, an example in which the foregoing first device is an exciter, the foregoing second device is a receiver, and the foregoing third device is a backscatter device is described.

Figure 4:
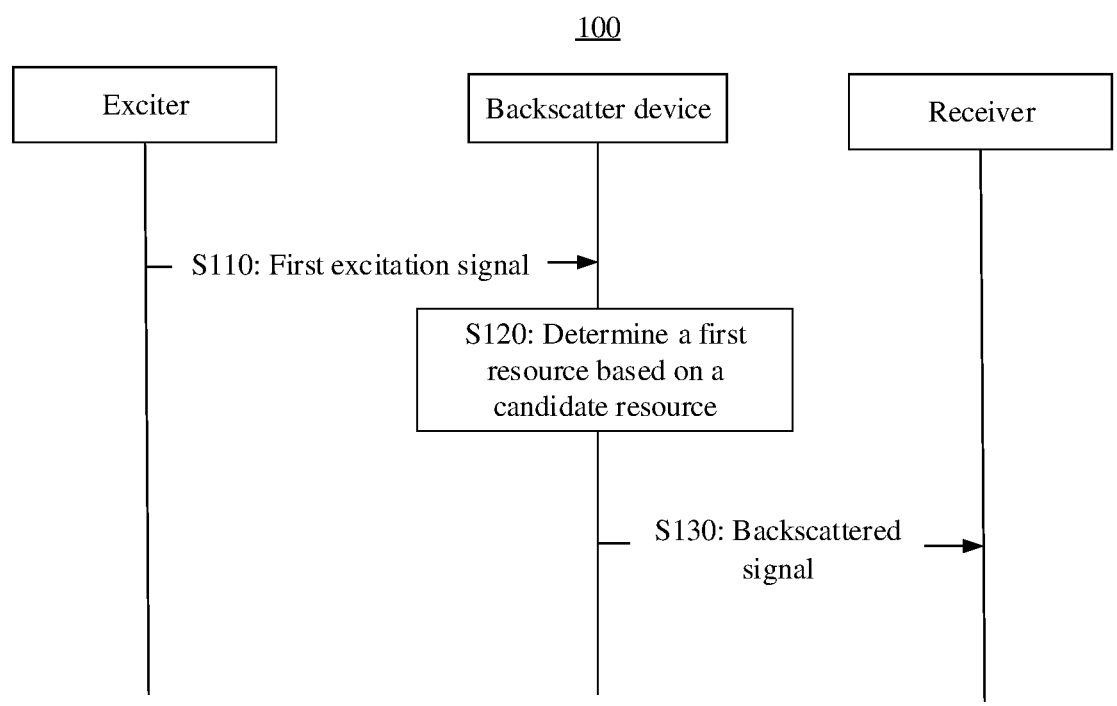
FIG. 4 is a schematic diagram of a backscatter communication method according to an embodiment of this disclosure.

With reference to FIG. 4, the following describes a backscatter communication method 100 provided in an embodiment of this disclosure. The backscatter communication method 100 includes the following steps.

S110: An exciter sends a first excitation signal to a backscatter device, and the backscatter device receives the first excitation signal from the exciter.

S120: The backscatter device determines a first resource based on a candidate resource.

Optionally, the candidate resource may be preconfigured. Optionally, the exciter may send a second resource configuration to the backscatter device. The second resource configuration is used to indicate the candidate resource. Optionally, a receiver may send a second resource configuration to the exciter, and the exciter forwards the second resource configuration to the backscatter device. The second resource configuration is used to indicate the candidate resource.

Optionally, the first resource is determined based on a first offset step and a first factor. For example, the first resource may be obtained by multiplying the first offset step and the first factor, or the first resource may be obtained after a value obtained by multiplying the first offset step and the first factor is scaled. For example, if the first factor is m, and the first offset step is $\Delta f$, the first resource may be m$\Delta f$ or a value obtained by scaling m$\Delta f$.

The candidate resource is discussed in the following four cases:

Case 1: Candidate resources include candidate factors, and the candidate factors include the first factor. In other words, the first factor for determining the first resource needs to be obtained from the candidate factors included in the candidate resources, and the first offset step for determining the first resource may be a default value or a preset value. Optionally, the backscatter device may select the first factor from the candidate factors. For example, the backscatter device may select one of the candidate factors as the first factor according to a specific rule 1. The specific rule 1 can enable different backscatter devices to select different factors, or the specific rule 1 can reduce a probability that different backscatter devices select a same factor. For another example, the backscatter device may randomly select one of the candidate factors as the first factor. In this way, a probability that two different backscatter devices select a same factor is reduced. For example, a rule 1 is to randomly select, at an equal probability, one of a plurality of factors included in the candidate factors. For another example, a rule 1 is to select one of the candidate factors based on a hardware capability or an energy status (for example, power) of the backscatter device. When the energy status is high (for example, there is much power), a relatively large factor is selected from the candidate factors; otherwise, a relatively small factor is selected.

In Case 1, S120 includes: The backscatter device selects the first factor from the candidate factors included in the candidate resources; and the backscatter device determines the first resource based on the selected first factor and the default or preset first offset step. For example, the candidate factors may be $\{m_1, m_2, \ldots m_i\}$, where i is a positive integer, and $m_1, m_2, \ldots m_i$ are integers, and the first factor may be one of $\{m_1, m_2, \ldots m_i\}$. For example, the candidate factor may be a value range [N, M], the second resource configuration only needs to indicate N, M, and the backscatter device may learn, according to a specific rule, that the candidate factor is [N, M]. For example, [N, M] is [−5,10]. For another example, the candidate factor may be a value range [−M, M], the second resource configuration may indicate M or −M, and the backscatter device may learn, according to a specific rule, that the candidate factor is [−M, M]. For still another example, the candidate factor may be a value range [−∞,M] or [M, +∞], the second resource configuration may indicate M, and the backscatter device may learn, according to a specific rule, that the candidate factor is [−∞, M] or [M, +∞].

Case 2: Candidate resources include candidate offset steps, and the candidate offset steps include the first offset step. In other words, the first offset step for determining the first resource needs to be obtained from the candidate steps included in the candidate resources, and the first factor for determining the first resource may be a default value or a preset value. Optionally, the first offset step may be selected from the candidate offset steps. For example, one of the candidate offset steps may be selected as the first offset step according to a specific rule 2. The specific rule 2 can enable different backscatter devices to select different offset steps, or the specific rule 2 can reduce a probability that different backscatter devices select a same offset step. For another example, one of the candidate offset steps may be randomly selected as the first offset step. In this way, a probability that two different backscatter devices select a same offset step is reduced. In this way, different backscatter devices can send backscattered signals to the receiver on different resources, so that an access success rate can be improved.

In Case 2, S120 includes: The backscatter device selects the first offset step from the candidate offset steps included in the candidate resources; and the backscatter device determines the first resource based on the selected first offset step and the default or preset first factor. For example, the candidate offset steps may be $\{\Delta f_1, \Delta f_2, \ldots \Delta f_j\}$, where j is a positive integer, or the candidate offset step may be a value range [$\Delta F_1$, $\Delta F_2$], and the first offset step may be one of $\{\Delta f_1, \Delta f_2, \ldots \Delta f_j\}$. A form of the candidate offset step is the same as that of the candidate factor in Case 1. For ease of description, details are not described again in this embodiment of this disclosure.

Case 3: Candidate resources include candidate offset steps and candidate factors, the candidate offset steps include the first offset step, and the candidate factors include the first factor. In other words, the first offset step for determining the first resource needs to be obtained from the candidate steps included in the candidate resources, and the first factor for determining the first resource also needs to be obtained from the candidate factors included in the candidate resources.

Optionally, the first offset step may be selected from the candidate offset steps. For example, according to a specific rule 3, one of the candidate offset steps may be selected as the first offset step, and one of the candidate factors may be selected as the first factor. The specific rule 3 can enable different backscatter devices to select different offset steps and/or different factors, or the specific rule 3 can reduce a probability that different backscatter devices select a same offset step and/or a same factor. For another example, one of the candidate offset steps may be randomly selected as the first offset step, and one of the candidate factors may be randomly selected as the first factor. In this way, a probability that two different backscatter devices select a same offset step and a same factor is reduced.

In Case 3, S120 includes: The backscatter device selects the first offset step from the candidate offset steps included in the candidate resources, and selects the first factor from the candidate factors included in the candidate resources; and the backscatter device determines the first resource based on the selected first offset step and the selected first factor. The candidate factors may be $\{m_1, m_2, \ldots m_i\}$, and the first factor may be one of $\{m_1, m_2, \ldots m_i\}$. The candidate offset steps may be $\{\Delta f_1, \Delta f_2, \ldots \Delta f_j\}$, and the first offset step may be one of $\{\Delta f_1, \Delta f_2, \ldots \Delta f_j\}$.

Case 4: There may be one or more candidate resources, and each of the candidate resources is determined based on the first offset step and one factor. S120 includes: The backscatter device selects one of the candidate resources as the first resource. The candidate resources may be $\{m\Delta f_1, m\Delta f_2, \ldots m\Delta f_I\}$, and the first resource may be one of $\{m\Delta f_1, m\Delta f_2, \ldots m\Delta f_I\}$. For example, the first resource may be selected from the candidate resources according to a specific rule 4. The specific rule 4 can enable different backscatter devices to select different resources, or the specific rule 4 can reduce a probability that different backscatter devices select a same resource.

In Case 1, a probability that different backscatter devices select a same factor can be reduced. In Case 2, a probability that different backscatter devices select a same offset step can be reduced. In Case 3, a probability that different backscatter devices select a same offset step and/or a same factor can be reduced. In Case 4, a probability that different backscatter devices select a same resource can be reduced. A probability that different backscatter devices determine a same resource can be reduced in all of the four cases. Different backscatter devices may send backscattered signals to the receiver on different resources, and the receiver may recognize different backscatter devices based on different resources, so that an access success rate can be improved.

In this embodiment of this disclosure, an offset step in the candidate offset steps may be measured in frequency domain, in other words, the offset step corresponds to a frequency value $\Delta f$. Alternatively, an offset step may be measured in time domain, and the offset step corresponds to a time period T (or a time span T) and a square wave signal in the time period T. A different offset step may mean that at least one of a time period, a square wave signal in the time period, and a square wave signal sequence (including a plurality of square wave signals consecutive in time) is different. For example, if a time period corresponding to an offset step 1 is different from a time period corresponding to an offset step 2, but a square wave signal and a square wave signal sequence in the time period corresponding to the offset step 1 are the same as a square wave signal and a square wave signal sequence in the time period corresponding to the offset step 2, it is considered that the offset step 1 is different from the offset step 2. For another example, if a time period corresponding to an offset step 1 is the same as a time period corresponding to an offset step 2, provided that one of a square wave signal and a square wave signal sequence in the time period corresponding to the offset step 1 is different from a square wave signal or a square wave signal sequence in the time period corresponding to the offset step 2, it is considered that the offset step 1 is different from the offset step 2. For still another example, if a time period corresponding to an offset step 1 is different from a time period corresponding to an offset step 2, a square wave signal in the time period corresponding to the offset step 1 is different from a square wave signal in the time period corresponding to the offset step 2, and a square wave signal sequence in the time period corresponding to the offset step 1 is different from a square wave signal sequence in the time period corresponding to the offset step 2, it is considered that the offset step 1 is different from the offset step 2.

There may be two (for example, FIG. 2) or more square wave signals in a time period T. In other words, two or more square wave signals constitute a square wave signal sequence in one period. Specifically, a quantity of states (namely, amplitude and/or a phase) of one square wave signal may be 1, 2, or another value. Time lengths of square wave signal states may be equal or unequal. For example, when an offset step corresponds to a sequence including a plurality of different square wave signal states (amplitude and phases) in a time period T, there may be two square wave signal states, namely, 1 and 0, or 1 and −1. For another example, there may be four square wave signal states, which may be $$\exp^{j\frac{\pi}{4}}, \exp^{j\frac{3\pi}{4}}, \exp^{j\frac{5\pi}{4}}, \text{ and } \exp^{j\frac{7\pi}{4}}.$$

Specifically, a time period T and a square wave signal sequence in the time period T that correspond to an offset step are further described by using examples. For example, the time period T is 1/15000 second, there are four square wave signals in T, the four square wave signals may constitute a square wave signal sequence, and states of the four square wave signals are exp jπ/4, $$\exp^{j\frac{3\pi}{4}}, \exp^{j\frac{5\pi}{4}}, \text{ and } \exp^{j\frac{7\pi}{4}}.$$

A square wave signal sequence corresponding to an offset step 1 is $$\left[\exp^{j\frac{\pi}{4}}, \exp^{j\frac{\pi}{4}}, \exp^{j\frac{\pi}{4}}, \exp^{j\frac{\pi}{4}}\right],$$

a square wave signal sequence corresponding to an offset step 2 is $$\left[\exp^{j\frac{\pi}{4}}, \exp^{j\frac{3\pi}{4}}, \exp^{j\frac{5\pi}{4}}, \exp^{j\frac{7\pi}{4}}\right],$$

a square wave signal sequence corresponding to an offset step 3 is $$\left[\exp^{j\frac{\pi}{4}}, \exp^{j\frac{5\pi}{4}}, \exp^{j\frac{\pi}{4}}, \exp^{j\frac{5\pi}{4}}\right],$$

and a square wave signal sequence corresponding to an offset step 4 is $$\left[\exp^{j\frac{\pi}{4}}, \exp^{j\frac{7\pi}{4}}, \exp^{j\frac{5\pi}{4}}, \exp^{j\frac{3\pi}{4}}\right].$$

More generally, a length of a square wave signal sequence in one time period is N, and each element in the square wave signal sequence is one of M candidate square wave signal states. The M candidate square wave signal states are $s_0$, $s_1, \ldots, s_{M-1}$. A square wave signal sequence corresponding to the $k^{th}$ offset step is $[s_{k0}, s_{k1}, \ldots, s_{kN-1}]$, where any $s_{ki}$ is one of $s_0, s_1, \ldots, s_{M-1}$, and i=0, 1, . . . , N−1. Optionally, $s_{k0}, s_{k1}, \ldots, s_{kN-1}$ may include a same value. Optionally, the $k^{th}$ offset step corresponds to a combination $[k_0, k_1, \ldots, k_{N-1}]$ of state indexes of N square wave signals, where $k_j$ is an index of one of $s_0, s_1, \ldots, s_{M-1}$, and j=0, 1, . . . , N−1.

S130: The backscatter device sends a backscattered signal of the first excitation signal to the receiver based on the first resource, and the receiver may receive, on a second resource, the backscattered signal sent by the backscatter device.

Optionally, S130 may include: The backscatter device sends the backscattered signal to the receiver by offsetting, by the first resource, a resource on which the first excitation signal is received.

For example, a center frequency of the backscattered signal of the first excitation signal is at a location obtained by moving a center frequency of the first excitation signal by $m\Delta f$ (the first resource).

For another example, a highest frequency of the backscattered signal of the first excitation signal is at a location obtained by moving a highest frequency of the first excitation signal by $m\Delta f$ (the first resource).

For still another example, a lowest frequency of the backscattered signal of the first excitation signal is at a location obtained by moving a lowest frequency of the first excitation signal by $m\Delta f$ (the first resource).

Optionally, the first offset step is a candidate frequency offset step, and the first offset step is greater than bandwidth of the first excitation signal. In this case, when the backscatter device sends the backscattered signal by offsetting, by the first resource, the resource on which the first excitation signal is received, a conflict with sending a backscattered signal by another backscatter device can be avoided. Optionally, any one of candidate offset steps is greater than the bandwidth of the first excitation signal. In this case, when different backscatter devices receive the first excitation signal on a same frequency, the backscatter devices may select different offset steps from the candidate offset steps, and the offset steps are greater than the bandwidth of the first excitation signal. Resources on which different backscatter devices send backscattered signals may be staggered in frequency domain, to avoid spectrum aliasing, thereby avoiding a conflict.

Optionally, the first excitation signal may be any form of signal. For example, the first excitation signal may be a monophonic signal, or the first excitation signal may be a pseudo-random signal.

If the first excitation signal is a pseudo-random signal, and the pseudo-random signal may occupy specific bandwidth, this helps the receiver to perform detection. In addition, bandwidth of the pseudo-random signal may be constrained, and bandwidth of the backscattered signal of the first excitation signal may be further constrained, so that it can be ensured that a backscatter communication system does not affect another communications system. A pseudo-random sequence or a pseudo-random code in the pseudo-random signal has some statistical characteristics similar to those of random noise, and can be repeatedly generated. The pseudo-random sequence or the pseudo-random code may be generated from an m sequence, an M sequence, a gold sequence, a quadratic residual sequence, a double-prime sequence, a ZC sequence, a frank sequence, a Golomb sequence, a chirp sequence, or a P4 sequence.

If the first excitation signal is a pseudo-random signal, because the pseudo-random signal occupies specific bandwidth, after the backscatter device receives the pseudo-random signal sent by the exciter, the backscatter device sends the backscattered signal of the first excitation signal to the receiver on a third resource obtained by offsetting, by the first resource, the resource on which the first excitation signal is received. Because the backscatter device has low costs, and a clock of the backscatter device is inaccurate, the backscatter device sends the backscattered signal of the first excitation signal to the receiver on the third resource based on the clock of the backscatter device, an actual resource on which the receiver receives the backscattered signal may not be the third resource, and the receiver may receive the backscattered signal on the second resource. Therefore, clock information of the backscatter device needs to be determined based on the second resource on which the backscattered signal is actually received. The clock information may be a clock offset relative to the inaccurate clock of the backscatter device or an accurate clock value of the backscatter device. The determined clock information may be sent to the backscatter device, and the backscatter device adjusts the clock of the backscatter device based on the clock information. The following describes how to determine the clock information of the backscatter device.

Because the second resource on which the receiver receives the backscattered signal is not far from the third resource on which the backscatter device sends the backscattered signal based on the inaccurate clock of the backscatter device, the third resource on which the backscatter device sends the backscattered signal may be determined based on the second resource, and the clock information of the backscatter device may be determined based on the third resource and the second resource on which the backscattered signal is actually received.

For example, if the backscatter device receives the first excitation signal on $f_c$, and the backscatter device determines that the first resource is $m\Delta f$, the backscatter device needs to send the backscattered signal of the first excitation signal on $f_c+m\Delta f$ (the third resource). However, because the clock information of the backscatter device is inaccurate, the backscatter device considers that the backscattered signal is sent on $f_c+m\Delta f$, but a resource location on which the backscattered signal is actually sent is the second resource, and the receiver also receives the backscattered signal on the second resource. Because the second resource is not far from $f_c+m\Delta f$, $f_c+m\Delta f$ may be determined based on the second resource, in other words, it may be determined that the backscatter device should send the backscattered signal on $f_c+m\Delta f$. However, the backscatter device actually sends the backscattered signal on the second resource. Therefore, the clock information of the backscatter device may be determined based on a difference between the second resource on which the backscatter device actually sends the backscattered signal and $f_c+m\Delta f$.

It should be noted that if the clock of the backscatter device is accurate, the third resource obtained after the backscatter device offsets, by the first resource, the resource on which the first excitation signal is received is the second resource on which the receiver receives the backscattered signal. If the clock of the backscatter device is inaccurate, the backscatter device sends the backscattered signal on the third resource determined based on the inaccurate clock of the backscatter device. However, actually, the backscatter device sends the backscattered signal on the second resource, and the receiver also receives the backscattered signal on the second resource.

In this embodiment of this disclosure, the clock information is used to determine a time length or a frequency. Specifically, at a backscatter device end, the clock information is used to determine a time period T or a size of a frequency offset step. If the clock information is measured in time domain, and a granularity of a basic unit of measurement is X seconds, the clock information is an integer multiple of the basic granularity. If the clock information sent to the backscatter device (correspondingly, received by the backscatter device) is Y basic granularities, a time period T1 (or other time, where the time may be predefined or configured for the backscatter device by the exciter) corresponding to one offset step before adjustment of the backscatter device is (T1/X) basic granularities, and a time period after the adjustment of the backscatter device is T2=((T1/X)+Y)*X seconds, in other words, the time period T2 after the adjustment of the backscatter device is ((T1/X)+Y) basic granularities. The basic granularity is predefined or determined based on configuration information of the exciter or indicated by the configuration information of the exciter. If the clock information is measured in frequency domain, when the backscatter device sends the backscattered signal, the backscatter device increases an original offset step $\Delta F1$ by the received clock information F, in other words, an adjusted offset step is $\Delta F1+F$. The backscatter device may adjust the clock by using the clock information, and send information to the receiver by using an adjusted clock, for example, send a first identifier of the backscatter device or send a backscattered signal.

In this embodiment of this disclosure, the exciter needs to forward information when the receiver sends the information to the backscatter device. Certainly, the receiver may directly send information to the backscatter device. The following describes a case in which the exciter needs to forward information when the receiver sends the information to the backscatter device.

The clock information may be determined by the receiver and sent to the backscatter device by the receiver by using the exciter. Optionally, the clock information may be sent to the backscatter device by using first receiving resource information. Alternatively, after receiving the backscattered signal of the first excitation signal on the second resource, the receiver may send, to the exciter by using first receiving resource information, an event that the receiver receives, on the second resource, the backscattered signal that is of the first excitation signal and that is sent by the backscatter device. The exciter determines the clock information based on the first receiving resource information sent by the backscatter device, and sends the clock information to the backscatter device.

Optionally, after the receiver receives the backscattered signal of the first excitation signal on the second resource, the receiver may determine a first resource configuration for the backscatter device. The first resource configuration is used to transmit the first identifier of the backscatter device, in other words, the first resource configuration is used by the backscatter device to send the first identifier and the receiver to receive the first identifier. The receiver sends the first resource configuration to the exciter, and then the exciter forwards the first resource configuration to the backscatter device. The receiver may receive, on a resource indicated by the first resource configuration, the first identifier sent by the backscatter device. After the receiver receives the first identifier sent by the backscatter device, the receiver may allocate a second identifier to the backscatter device, and send an access acknowledgment message to the exciter. The access acknowledgment message carries the second identifier. The exciter forwards the access acknowledgment message to the backscatter device. Optionally, after receiving the backscattered signal of the first excitation signal on the second resource, the receiver may send, to the exciter by using first receiving resource information, an event that the receiver receives, on the second resource, the backscattered signal that is of the first excitation signal and that is sent by the backscatter device. The exciter may determine, based on the first receiving resource information sent by the receiver, that the receiver receives the backscattered signal sent by the backscatter device. The exciter may determine a first resource configuration for the backscatter device, and send the first resource configuration to the backscatter device and the receiver. The backscatter device sends the first identifier to the receiver on a resource indicated by the first resource. The receiver receives, on the resource indicated by the first resource, the first identifier sent by the backscatter device. The receiver sends, to the exciter by using second receiving resource information, an event that the receiver receives, on the resource indicated by the first resource configuration, the first identifier sent by the backscatter device. The exciter may determine, based on the second receiving resource information, that the receiver successfully receives the first identifier sent by the backscatter device. The exciter sends an access acknowledgment message to the backscatter device. The access acknowledgment message includes a second identifier allocated to the backscatter device by the exciter.

Therefore, according to the backscatter communication method provided in this disclosure, after receiving the first excitation signal, the backscatter device may send the backscattered signal of the first excitation signal to the receiver based on the first resource determined based on the candidate resource, so that a probability of selecting a same resource as another backscatter device can be reduced to some extent, thereby reducing a conflict and improving an access success rate of the backscatter device.

Figure 5:
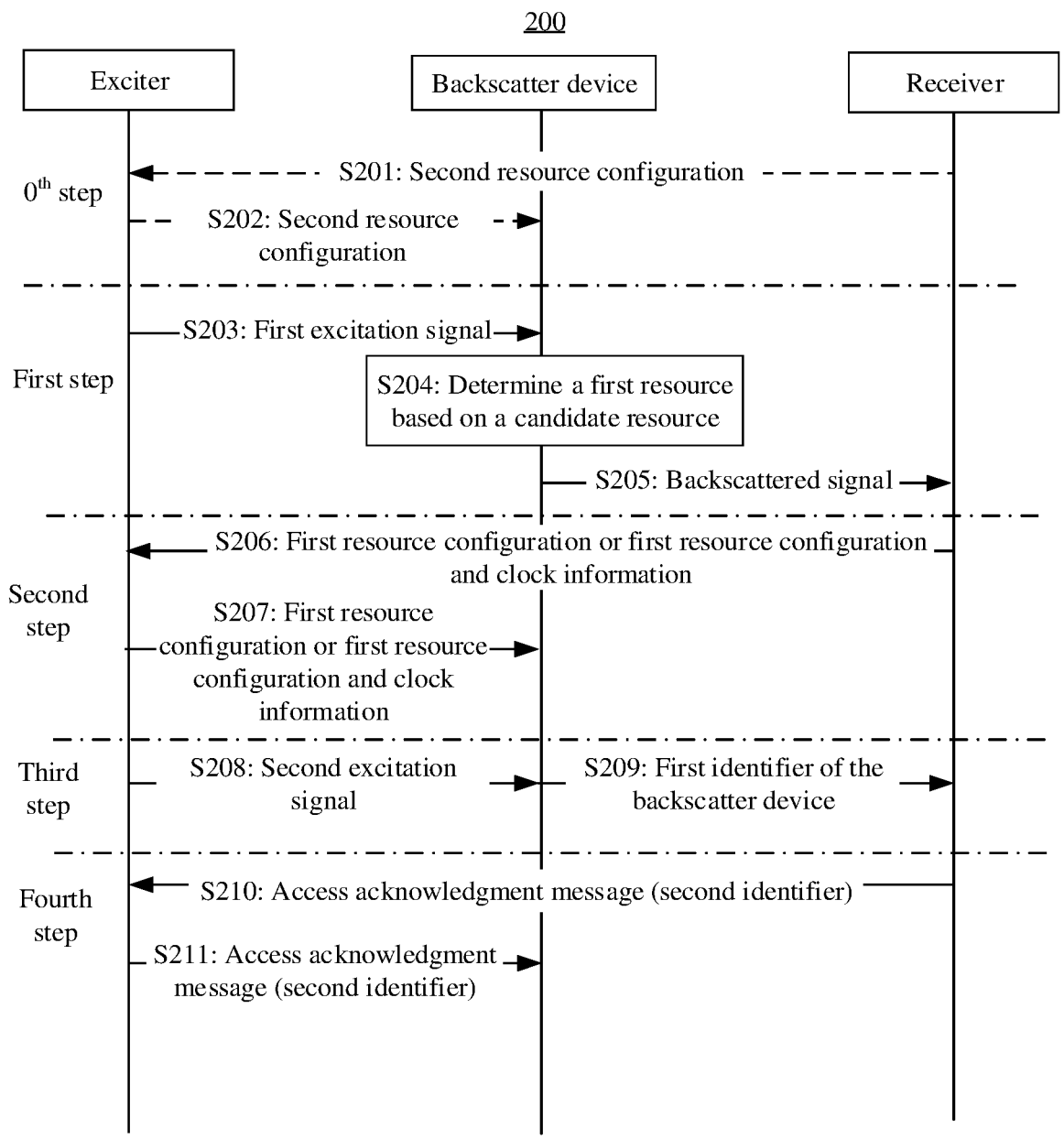
FIG. 5 is a schematic diagram of another backscatter communication method according to an embodiment of this disclosure.
Figure 6:
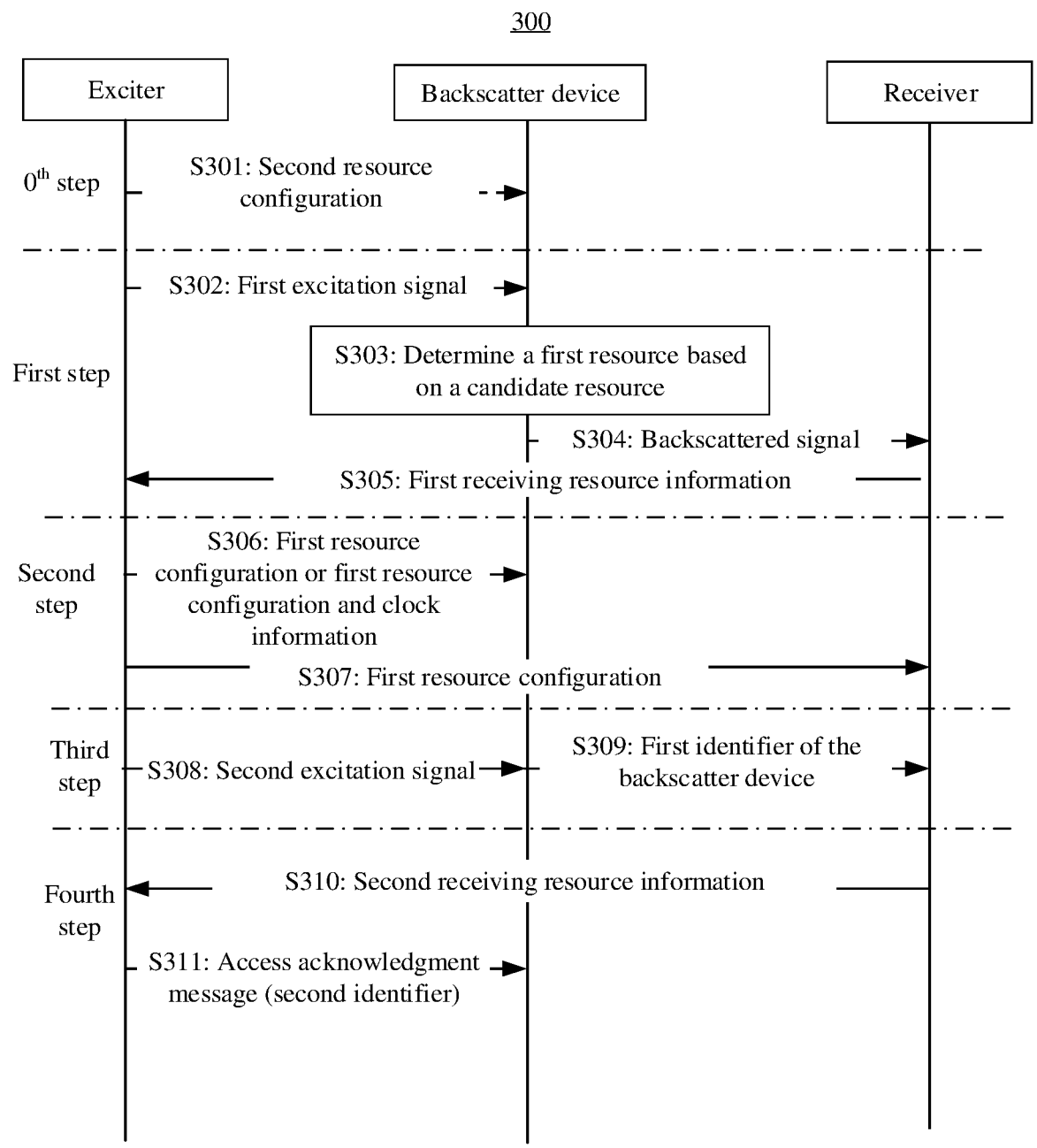
FIG. 6 is a schematic diagram of still another backscatter communication method according to an embodiment of this disclosure.

With reference to FIG. 5 and FIG. 6, the following describes the backscatter communication method provided in the embodiments of this disclosure.

FIG. 5 shows a backscatter communication method 200 according to an embodiment of this disclosure. The method 200 includes the following steps.

S201: A receiver sends a second resource configuration to an exciter, and the exciter receives the second resource configuration sent by the receiver, where the second resource configuration is used to indicate a candidate resource.

S202: The exciter sends the second resource configuration to a backscatter device.

S201 and S202 may also be referred to as the $0^{th}$ step of random access of backscatter communication, and the $0^{th}$ step is an optional step. In other words, the backscatter device needs to receive, by using the exciter, the second resource configuration sent by the receiver, to determine the candidate resource. The candidate resource may be preset or specified in a protocol.

S203: The exciter sends a first excitation signal to the backscatter device, and the backscatter device receives the first excitation signal sent by the exciter.

S204: The backscatter device determines a first resource based on the candidate resource. For specifically determining, by the backscatter device, the first resource based on the candidate resource, refer to S120.

It should be noted that a sequence of S203 and S204 is not limited, provided that S203 is before S205. S203 may be performed before or after S204, or S203 and S204 may be performed at the same time.

S205: The backscatter device sends a backscattered signal of the first excitation signal to the receiver based on the first resource, and the receiver receives the backscattered signal sent by the backscatter device.

S203 to S205 may be referred to as the first step of random access of backscatter communication.

Optionally, the backscatter device sends the backscattered signal of the first excitation signal to the receiver on a third resource obtained by offsetting, by the first resource, a resource on which the first excitation signal is received. If a clock of the backscatter device is inaccurate, the backscatter device sends the backscattered signal to the receiver on a second resource instead of sending the backscattered signal on the third resource determined by the backscatter device, and the receiver receives the backscattered signal on the second resource. If a clock of the backscatter device is accurate, a third resource obtained after the backscatter device offsets, by the first resource, the resource on which the first excitation signal is received is a second resource on which the receiver receives the backscattered signal.

S206: After receiving the backscattered signal, the receiver may determine a first resource configuration for the backscatter device, where the first resource configuration is used to indicate a resource for sending a first identifier by the backscatter device, and the receiver sends the first resource configuration to the exciter.

Optionally, the receiver may determine clock information of the backscatter device based on the second resource. For a specific manner of determining the clock information, refer to the method 100.

Therefore, when the receiver can determine the clock information, the receiver may also send the clock information to the exciter in S206. The first resource configuration and the clock information may be sent to the exciter together, or may be separately sent to the exciter. This is not limited in this embodiment of this disclosure.

S207: The exciter sends the received first resource configuration or the received first resource configuration and the received clock information to the backscatter device. Similarly, if the exciter receives the first resource configuration and the clock information, the exciter may send the first resource configuration and the clock information to the backscatter device together, or may separately send the first resource configuration and the clock information to the backscatter device.

S206 and S207 may be referred to as the second step of random access of backscatter communication.

S208: The exciter sends a second excitation signal to the backscatter device.

S209: After the backscatter device receives the second excitation signal, the backscatter device sends the first identifier of the backscatter device to the receiver on the resource indicated by the first resource configuration, and the receiver receives, on the resource indicated by the first resource configuration, the first identifier sent by the backscatter device.

Optionally, if the backscatter device further receives the clock information, after the backscatter device adjusts the clock based on the clock information before S209, the backscatter device sends the first identifier of the backscatter device to the receiver on the resource indicated by the first resource configuration.

S208 and S209 may be referred to as the third step of random access of backscatter communication.

S210: After the receiver receives the first identifier sent by the backscatter device, the receiver sends an access acknowledgment message to the exciter, where the access acknowledgment message includes a second identifier allocated to the backscatter device by the receiver.

Optionally, the access acknowledgment message may further indicate an acknowledgment (ACK) or a negative acknowledgment (NACK). The ACK is used to indicate that access succeeds, and the NACK is used to indicate that access fails. When the access acknowledgment message indicates an ACK, the access acknowledgment message also includes the second identifier allocated to the backscatter device by the receiver; or when the access acknowledgment message indicates a NACK, the access acknowledgment message does not include the second identifier allocated to the backscatter device by the receiver.

S211: After receiving the access acknowledgment message sent by the receiver, the exciter sends the access acknowledgment message to the backscatter device.

S210 and S211 may be referred to as the fourth step of random access of backscatter communication.

In the method 200, the receiver determines the first resource configuration or determines the first resource configuration and the clock information, in other words, the receiver may have a control function. Certainly, the exciter may also have a control function. To be specific, the exciter determines the first resource configuration or determines the first resource configuration and the clock information, and sends the first resource configuration or the first resource configuration and the clock information to the backscatter device. With reference to FIG. 6, the following provides descriptions by using the exciter with a control function.

FIG. 6 shows a backscatter communication method 300 according to an embodiment of this disclosure. The method 300 includes the following steps.

S301: An exciter sends a second resource configuration to a backscatter device, where the second resource configuration is used to indicate a candidate resource.

S301 may also be referred to as the $0^{th}$ step of random access of backscatter communication, and the $0^{th}$ step is an optional step. In other words, the backscatter device needs to receive, by using the exciter, the second resource configuration sent by a receiver, to determine the candidate resource. The candidate resource may be preset or specified in a protocol.

S302: The exciter sends a first excitation signal to the backscatter device, and the backscatter device receives the first excitation signal sent by the exciter. S303: The backscatter device determines a first resource based on the candidate resource. For specifically determining, by the backscatter device, the first resource based on the candidate resource, refer to S120.

S304: The backscatter device sends a backscattered signal of the first excitation signal to the receiver based on the first resource, and the receiver receives the backscattered signal sent by the backscatter device.

S305: The receiver sends first receiving resource information to the exciter, where the first receiving resource information includes an event that the receiver receives, on a second resource, the backscattered signal that is of the first excitation signal and that is sent by the backscatter device.

S302 to S305 may be referred to as the first step of random access of backscatter communication.

Optionally, the backscatter device sends the backscattered signal of the first excitation signal to the receiver on a third resource obtained by offsetting, by the first resource, a resource on which the first excitation signal is received. If a clock of the backscatter device is inaccurate, the backscatter device sends the backscattered signal to the receiver on the second resource instead of sending the backscattered signal on the third resource determined by the backscatter device, and the receiver receives the backscattered signal on the second resource.

S306: After receiving the first receiving resource information, the exciter may determine, based on the first receiving resource information, that the receiver receives the backscattered signal sent by the backscatter device; the exciter may determine a first resource configuration for the backscatter device, and send the first resource configuration to the backscatter device; and the backscatter device sends a first identifier to the receiver on a resource indicated by the first resource configuration.

In S306, the exciter may send both the first resource configuration and clock information to the backscatter device. Optionally, the clock information in S306 may be determined by the exciter based on the first receiving resource information. For a specific manner of determining the clock information, refer to the method 100. Optionally, the clock information may be determined by the receiver. The first receiving resource information in S305 may also include the clock information. The exciter forwards the clock information to the backscatter device through S306.

When the exciter sends both the first resource configuration and the clock information to the backscatter device, the exciter may send the first resource configuration and the clock information together or separately. This is not limited in this embodiment of this disclosure.

S307: The exciter also sends the first resource configuration to the receiver, and the receiver receives, on the resource indicated by the first resource configuration, the first identifier sent by the backscatter device.

S306 and S307 may be referred to as the second step of random access of backscatter communication.

S308: The exciter sends a second excitation signal to the backscatter device.

S309: After the backscatter device receives the second excitation signal, the backscatter device sends the first identifier of the backscatter device to the receiver on the resource indicated by the first resource configuration, and the receiver receives, on the resource indicated by the first resource configuration, the first identifier sent by the backscatter device.

Optionally, if the backscatter device further receives the clock information, after the backscatter device adjusts the clock based on the clock information before S309, the backscatter device sends the first identifier of the backscatter device to the receiver on the resource indicated by the first resource configuration.

S308 and S309 may be referred to as the third step of random access of backscatter communication.

S310: The receiver sends, to the exciter by using second receiving resource information, an event that the receiver receives, on the resource indicated by the first resource configuration, the first identifier sent by the backscatter device.

S311: The exciter may determine, based on the second receiving resource information, that the receiver successfully receives the first identifier sent by the backscatter device, and the exciter sends an access acknowledgment message to the backscatter device, where the access acknowledgment message includes a second identifier allocated to the backscatter device by the exciter.

S310 and S311 may be referred to as the fourth step of random access of backscatter communication.

Optionally, the access acknowledgment message may further indicate an ACK or a NACK. The ACK is used to indicate that access succeeds, and the NACK is used to indicate that access fails. When the access acknowledgment message indicates an ACK, the access acknowledgment message also includes the second identifier allocated to the backscatter device by the exciter; or when the access acknowledgment message indicates a NACK, the access acknowledgment message does not include the second identifier allocated to the backscatter device by the exciter.

It should be noted that an execution body of determining the first resource configuration or determining the first resource configuration and the clock information is not limited in this embodiment of this disclosure. FIG. 5 and FIG. 6 are merely examples for description. In the method 200 in FIG. 5, the receiver determines the first resource configuration, or the receiver determines the clock information and the first resource configuration. In the method 300 in FIG. 6, the exciter determines the first resource configuration, or the exciter determines the clock information and the first resource configuration. In an actual application, an additional control device independent of the exciter and the receiver may determine the first resource configuration or determine the first resource configuration and the clock information. Alternatively, the exciter and the receiver may be located on one node, in other words, the node including the exciter and the receiver may determine the first resource configuration or determine the first resource configuration and the clock information.

It should also be noted that the "resource" in the embodiments of this disclosure may be understood as a frequency domain resource, a time domain resource, or a time-frequency resource. In other words, the candidate resource may be a candidate frequency domain resource, a candidate time domain resource, or a candidate time-frequency resource. The first resource may be a first time domain resource, a first frequency domain resource, or a first time-frequency resource. The second resource may be a second time domain resource, a second frequency domain resource, or a second time-frequency resource. The third resource may be a third time domain resource, a third frequency domain resource, or a third time-frequency resource. The candidate offset step may be a candidate time domain offset step, a candidate frequency domain offset step, or a candidate time-frequency offset step.

Figure 7:
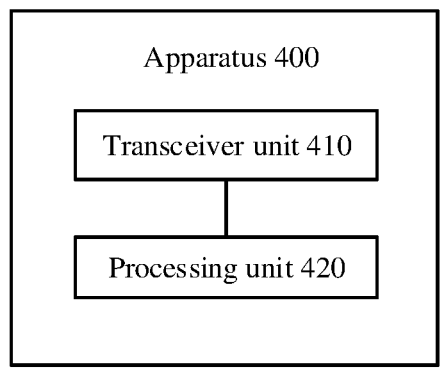
FIG. 7 is a schematic block diagram of a backscatter communication apparatus according to an embodiment of this disclosure.
Figure 8:
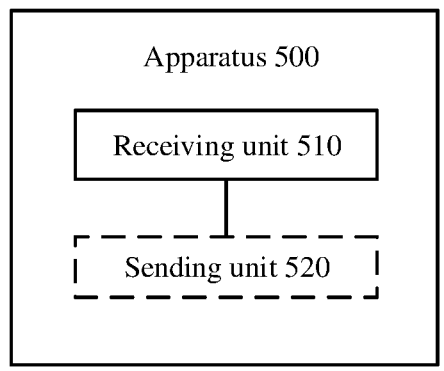
FIG. 8 is a schematic block diagram of another backscatter communication apparatus according to an embodiment of this disclosure.
Figure 9:
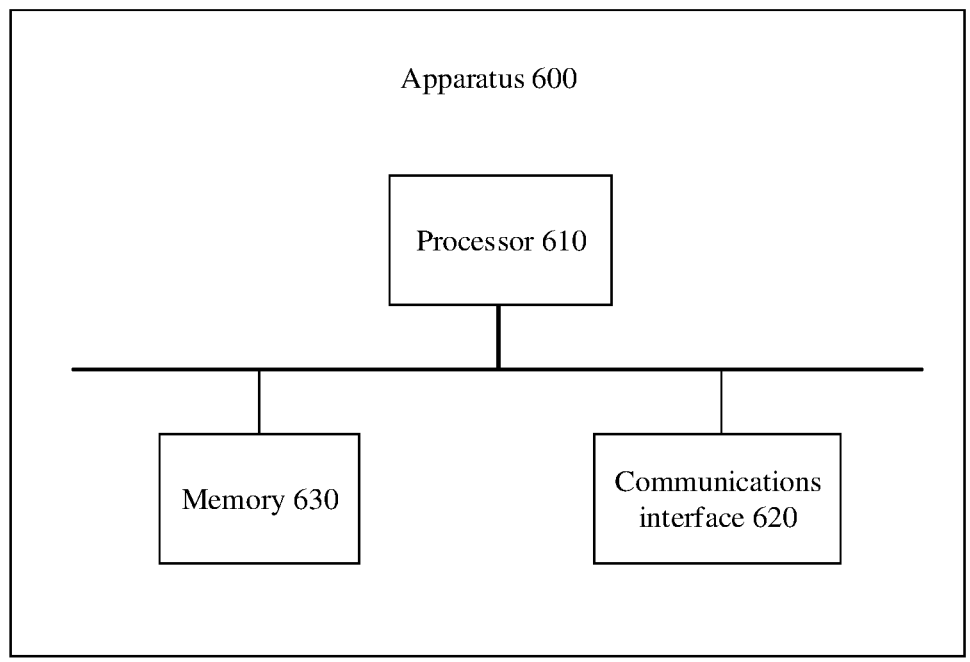
FIG. 9 is a schematic block diagram of still another backscatter communication apparatus according to an embodiment of this disclosure.

With reference to FIG. 1 to FIG. 6, the foregoing describes in detail the backscatter communication method provided in the embodiments of this disclosure. With reference to FIG. 7 to FIG. 9, the following describes in detail a backscatter communication apparatus provided in the embodiments of this disclosure.

FIG. 7 is a schematic block diagram of a backscatter communication apparatus 400 according to an embodiment of this disclosure. The apparatus 400 may correspond to the backscatter device described in the foregoing methods, or may correspond to a chip or a component of the backscatter device. In addition, modules or units in the apparatus 400 may be separately configured to perform the actions or the processing processes performed by the backscatter device in the foregoing methods. As shown in FIG. 7, the backscatter communication apparatus 400 may include a transceiver unit 410 and a processing unit 420.

The transceiver unit 410 is configured to receive a first excitation signal from a first device.

The processing unit 420 is configured to determine a first resource based on a candidate resource.

The transceiver unit 410 is further configured to send a backscattered signal of the first excitation signal to a second device based on the first resource.

In an optional embodiment, the first resource is determined based on a first offset step and a first factor. The first offset step is included in a candidate offset step, and the candidate resource includes the candidate offset step; and/or
the first factor is included in a candidate factor, and the candidate resource includes the candidate factor.

In an optional embodiment, the first offset step is a frequency offset step, and the frequency offset step is greater than or equal to bandwidth of the first excitation signal.

In an optional embodiment, the first excitation signal is a pseudo-random signal.

In an optional embodiment, the transceiver unit 410 is further configured to receive clock information from the first device.

In an optional embodiment, the transceiver unit 410 is further configured to: receive a first resource configuration from the first device; receive a second excitation signal from the first device, and send a first identifier of a third device to the second device on a resource indicated by the first resource configuration; and receive an access acknowledgment message from the first device, where the access acknowledgment message includes a second identifier allocated to the third device by the first device or the second device.

In an optional embodiment, the transceiver unit 410 is further configured to receive a second resource configuration from the first device, where the second resource configuration is used to indicate the candidate resource.

It should be understood that for a specific process in which the units in the apparatus 400 perform the foregoing corresponding steps, refer to the foregoing descriptions in the method embodiments described with reference to FIG. 4 to FIG. 6. For brevity, details are not described herein again.

FIG. 8 is a schematic block diagram of a backscatter communication apparatus 500 according to an embodiment of this disclosure. The apparatus 500 may correspond to the exciter or the receiver described in the foregoing methods, or may correspond to a chip or a component of the exciter or the receiver. In addition, modules or units in the apparatus 500 may be separately configured to perform the actions or the processing processes performed by the exciter or the receiver in the foregoing methods. As shown in FIG. 8, the backscatter communication apparatus 500 may include a receiving unit 510.

The receiving unit 510 is configured to receive a backscattered signal that is of a first excitation signal and that is sent by a third device based on a first resource, where the first resource is determined based on a candidate resource.

In an optional embodiment, the first resource is determined based on a first offset step and a first factor. The first offset step is included in a candidate offset step, and the candidate resource includes the candidate offset step; and/or the first factor is included in a candidate factor, and the candidate resource includes the candidate factor.

In an optional embodiment, the first offset step is a frequency offset step, and the frequency offset step is greater than or equal to bandwidth of the first excitation signal.

In an optional embodiment, the apparatus further includes a sending unit 520, configured to send clock information to the third device.

In an optional embodiment, the sending unit 520 is specifically configured to send the clock information to the third device by using a first device.

In an optional embodiment, the sending unit 520 is further configured to send a first resource configuration to the third device, where the first resource configuration is used by the third device to send a first identifier.

In an optional embodiment, the sending unit 520 is specifically configured to send the first resource configuration to the third device by using the first device;
the receiving unit 510 is further configured to receive, on a resource indicated by the first resource configuration, the first identifier of the third device that is sent by the third device; and
the sending unit 520 is further configured to send an access acknowledgment message to the third device by using the first device, where the access acknowledgment message includes a second identifier allocated to the third device by a second device.

In an optional embodiment, the sending unit 520 is further configured to send the first resource configuration to a second device, so that the second device receives, on a resource indicated by the first resource configuration, the first identifier of the third device that is sent by the third device;
the receiving unit 510 is further configured to receive the first identifier of the backscatter terminal that is sent by the second device; and
the sending unit 520 is further configured to send an access acknowledgment message to the third device, where the access acknowledgment message includes a second identifier allocated to the third device by the first device.

In an optional embodiment, the sending unit 520 is further configured to send the first excitation signal to the third device before the backscattered signal that is of the first excitation signal and that is sent by the third device based on the first resource is received, where the first excitation signal is a pseudo-random signal.

In an optional embodiment, the sending unit 520 is further configured to send a second resource configuration to the third device before the backscattered signal that is of the first excitation signal and that is sent by the third device based on the first resource is received, where the second resource configuration is used to indicate the candidate resource.

It should be understood that, for a specific process in which the units in the apparatus 500 perform the foregoing corresponding steps, refer to the foregoing descriptions in the method embodiments with reference to FIG. 4 to FIG. 6. For brevity, details are not described herein again.

The apparatus 400 in the foregoing solutions has a function of implementing corresponding steps performed by the backscatter device in the foregoing methods, and the apparatus 500 in the foregoing solutions has a function of implementing corresponding steps performed by the exciter or the backscatter device in the foregoing methods. The function may be implemented by using hardware or software, or may be implemented by hardware executing corresponding software. The hardware or the software includes one or more modules corresponding to the foregoing functions. For example, the sending unit may be replaced with a communications interface; the receiving unit may be replaced with a communications interface; and another unit, for example, a determining unit, may be replaced with a processor, to separately perform a sending operation, a receiving operation, and a related processing operation in the method embodiments. In the embodiments of this disclosure, a communications interface of an apparatus is used by the apparatus to communicate with another device. For example, the communications interface may be a transmitter, a receiver, a transceiver, a circuit, a bus, a module, a pin, or another type of communications interface. This is not limited in the embodiments of this disclosure.

In a specific implementation process, the processor may be configured to perform, for example without limitation to, baseband related processing, and the communications interface may be configured to perform, for example without limitation to, information exchange. The foregoing components may be separately disposed on chips independent of each other, or at least a part or all of the components may be disposed on a same chip. For example, the processor may be further classified into an analog baseband processor and a digital baseband processor; and the analog baseband processor and the communications interface may be integrated on a same chip, and the digital baseband processor may be disposed on an independent chip. With continuous development of integrated circuit technologies, more components can be integrated into a same chip. For example, the digital baseband processor and a plurality of application processors (for example, but not limited to a graphics processing unit and a multimedia processor) may be integrated into a same chip. Such a chip may be referred to as a system on chip (SOC). Whether all the components are separately disposed on different chips or integrated and disposed on one or more chips usually depends on a specific requirement for a product design. Specific implementation forms of the components are not limited in the embodiments of this disclosure.

It may be understood that the processor in the foregoing embodiments may separately implement, by executing program instructions by using a hardware platform with a processor and a communications interface, functions involved in any design of the processor in the foregoing embodiments of this disclosure. Based on this, FIG. 9 is a schematic block diagram of a backscatter communication apparatus 600 according to an embodiment of this disclosure. The apparatus 600 includes a processor 610, a communications interface 620, and a memory 630. The processor 610, the communications interface 620, and the memory 630 are coupled to communicate with each other, the memory 630 is configured to store instructions, and the processor 610 is configured to execute the instructions stored in the memory 630, to control the communications interface 620 to send a signal and/or receive a signal. The coupling in this embodiment of this disclosure is indirect coupling or a communication connection between apparatuses, units, or modules for information exchange between the apparatuses, the units, or the modules, and may be in electrical, mechanical, or other forms.

In a possible implementation, if the apparatus 600 is a backscatter device, the communications interface 620 is configured to receive a first excitation signal from a first device, and the processor 610 is configured to determine a first resource based on a candidate resource; and the communications interface 620 is further configured to send a backscattered signal of the first excitation signal to a second device based on the first resource.

In a possible implementation, if the apparatus 600 is an exciter or a receiver, the communications interface 620 is configured to receive a backscattered signal that is of a first excitation signal and that is sent by a third device based on a first resource, where the first resource is determined based on a candidate resource.

It should be understood that the apparatus in FIG. 7 or the apparatus in FIG. 8 in the embodiments of this disclosure may be implemented by using the apparatus 600 in FIG. 9, and may be configured to perform steps and/or procedures corresponding to a transmit end and a receive end in the foregoing method embodiments.

It may be understood that the methods, the procedures, the operations, or the steps in the designs described in the embodiments of this disclosure can be implemented in a one-to-one correspondence manner by computer software, electronic hardware, or a combination of computer software and electronic hardware. Whether these functions are performed by hardware or software depends on particular applications and design constraints of the technical solutions. For example, in terms of good universality, low costs, and decoupling between software and hardware, program instructions may be executed to implement the functions. For another example, in terms of system performance and reliability, a dedicated circuit may be used to implement the functions. A person of ordinary skill in the art may use different methods to implement the described functions for each particular application. This is not limited herein.

According to the method provided in the embodiments of this disclosure, this disclosure further provides a computer program product. The computer program product includes computer program code. When the computer program code is run on a computer, the computer is enabled to perform the method in the foregoing embodiments. The embodiments in this disclosure may alternatively be combined with each other.

According to the methods provided in the embodiments of this disclosure, this disclosure further provides a computer-readable medium. The computer-readable medium stores program code. When the program code is run on a computer, the computer is enabled to perform the method in the foregoing embodiments.

In the embodiments of this disclosure, it should be noted that the method embodiments in the embodiments of this disclosure may be applied to a processor, or implemented by a processor. The processor may be an integrated circuit chip and has a signal processing capability. In an implementation process, the steps in the foregoing method embodiments may be completed by using a hardware integrated logic circuit in a processor or instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this disclosure. The general-purpose processor may be a microprocessor, any conventional processor, or the like.

It may be understood that the memory in the embodiments of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. There are a plurality of different types of RAMs, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be understood that sequence numbers of the foregoing processes do not mean execution sequences in the embodiments of this disclosure. The execution sequences of the processes should be determined based on functions and internal logic of the processes, and should not be construed as any limitation to the implementation processes of the embodiments of this disclosure.

The terms "first", "second", and the like in this disclosure are merely used to distinguish different objects, and "first" and "second" do not limit an actual sequence or functions of objects modified by "first" and "second". Any embodiment or design solution described as "example", "for example", "such as", "optionally", or "in some implementations" in this disclosure should not be construed as being more preferred or more advantageous than another embodiment or design. To be specific, these terms are used to present a related concept in a specific manner.

Names may be assigned to various objects that may appear in this disclosure, for example, various messages/information/devices/network elements/systems/apparatuses/operations. It may be understood that these specific names do not constitute a limitation on the related objects, and the assigned names may change with a factor such as a scenario, a context, or a use habit. Technical meanings of technical terms in this disclosure should be understood and determined mainly based on functions and technical effects that are of the technical terms and that are reflected/performed in the technical solutions.

All or a part of the foregoing embodiments may be implemented by software, hardware, firmware, or any combination thereof. When the software is used to implement the embodiments, all or a part of the embodiments may be implemented in a form of a computer program product. The computer program product may include one or more computer instructions. When the computer program instructions are loaded and executed on a computer, all or some of the procedures or functions according to the embodiments of this disclosure are generated. The computer may be a general-purpose computer, a dedicated computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (SSD)), or the like.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again. In the embodiments of this disclosure, on a premise that there is no logical contradiction, the embodiments may be mutually referenced. For example, methods and/or terms in the method embodiments may be mutually referenced, functions and/or terms in the apparatus embodiments may be mutually referenced, and functions and/or terms in the apparatus embodiments and the method embodiments may be mutually referenced.

In the several embodiments provided in this disclosure, it should be understood that the disclosed systems, apparatuses, and methods may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in the embodiments.

In addition, functional units in the embodiments of this disclosure may be integrated into one processing unit, or each of the units may exist alone physically, or two or more units may be integrated into one unit.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A backscatter communication method, comprising:
   receiving a first excitation signal from a first device;
   determining a first resource based on a candidate resource; wherein the first resource is a frequency domain resource, wherein:
   the candidate resource is a frequency domain resource;
   the first resource is determined based on a first offset step and a first factor, wherein the first offset step is a frequency offset step, and the frequency offset step is greater than or equal to bandwidth of the first excitation signal, and wherein determining the first resource comprises multiplying the first offset step and the first factor; and the determining of the first resource based on the candidate resource includes: selecting the first resource from candidate resources;

wherein, when the first factor for determining the first resource is a default value or a preset value, the candidate resources comprise candidate offset steps, the selecting the first resource from candidate resources comprises selecting one of the candidate offset steps as the first offset step according to a rule that is configured to enable different scatter devices to select different offset steps;

wherein, when the first offset step for determining the first resource is a default value or a preset value, the candidate resources comprise candidate factors, the selecting the first resource from candidate resources comprises selecting one of the candidate factors as the first factor according to a rule that is configured to enable different scatter devices to select different factors;

wherein when the candidate resources comprise candidate offset steps and candidate factors, the selecting the first resource from candidate resources comprises at least one of: (i) selecting one of the candidate factors as the first factor according to a rule that is configured to enable different scatter devices to select different factors or (ii) selecting one of the candidate offset steps as the first offset step according to the rule that is configured to enable different scatter devices to select different offset steps; and sending a backscattered signal of the first excitation signal to a second device based on the first resource.

2. The method according to claim 1, wherein the first excitation signal is a pseudo-random signal.

3. The method according to claim 1, wherein the method further comprises:
receiving clock information from the first device.

4. The method according to claim 1, wherein the method further comprises:
receiving a first resource configuration from the first device;
receiving a second excitation signal from the first device, and sending a first identifier of a third device to the second device on a resource indicated by the first resource configuration; and
receiving an access acknowledgment message from the first device, wherein the access acknowledgment message comprises a second identifier allocated to the third device by the first device or the second device.

5. The method according to claim 1, wherein the method further comprises:
receiving a second resource configuration from the first device, wherein the second resource configuration is used to indicate the candidate resource.

6. A backscatter communication method, comprising:
receiving a backscattered signal that is of a first excitation signal and that is sent by a third device based on a first resource, wherein the first resource is determined based on a candidate resource, wherein the first resource is a frequency domain resource, wherein:
the candidate resource is a frequency domain resource;
the first resource is determined based on a first offset step and a first factor, wherein the first offset step is a frequency offset step, and the frequency offset step is greater than or equal to bandwidth of the first excitation signal, and wherein determining the first resource comprises multiplying the first offset step and the first factor; and the determination of the first resource based on the candidate resource includes: selecting the first resource from candidate resources, where each one of the candidate resources is determined based on an offset step and a factor;

wherein, when the first factor for determining the first resource is a default value or a preset value, the candidate resources comprise candidate offset steps, the selecting the first resource from candidate resources comprises selecting one of the candidate offset steps as the first offset step according to a rule that is configured to enable different scatter devices to select different offset steps;

wherein, when the first offset step for determining the first resource is a default value or a preset value, the candidate resources comprise candidate factors, the selecting the first resource from candidate resources comprises selecting one of the candidate factors as the first factor according to a rule that is configured to enable different scatter devices to select different factors; and wherein when the candidate resources comprise candidate offset steps and candidate factors, the selecting the first resource from candidate resources comprises at least one of: (i) selecting one of the candidate factors as the first factor according to a rule that is configured to enable different scatter devices to select different factors or (ii) selecting one of the candidate offset steps as the first offset according to the rule that is configured to enable different scatter devices to select different offset steps.

7. The method according to claim 6, wherein the method further comprises:
sending clock information to the third device.

8. The method according to claim 7, wherein the sending of the clock information to the third device comprises:
sending the clock information to the third device by using a first device.

9. The method according to claim 6, wherein the method further comprises:
sending a first resource configuration to the third device, wherein the first resource configuration is used by the third device to send a first identifier.

10. The method according to claim 9, wherein the sending of the first resource configuration to the third device comprises:
sending the first resource configuration to the third device by using the first device; and
the method further comprises:
receiving, on a resource indicated by the first resource configuration, the first identifier of the third device that is sent by the third device; and
sending an access acknowledgment message to the third device by using the first device, wherein the access acknowledgment message comprises a second identifier allocated to the third device by a second device.

11. The method according to claim 9, wherein the method further comprises:
sending the first resource configuration to a second device, so that the second device receives, on a resource indicated by the first resource configuration, the first identifier of the third device that is sent by the third device;
receiving the first identifier of the third device that is sent by the second device; and sending an access acknowledgment message to the third device, wherein the access acknowledgment message comprises a second identifier allocated to the third device by the first device.

12. The method according to claim 11, wherein before the receiving of the backscattered signal that is of the first excitation signal and that is sent by the third device based on the first resource, the method further comprises:
sending the first excitation signal to the third device, wherein the first excitation signal is a pseudo-random signal.

13. The method according to claim 6, wherein before the receiving of the backscattered signal that is of the first excitation signal and that is sent by the third device based on the first resource, the method further comprises:
sending a second resource configuration to the third device, wherein the second resource configuration is used to indicate the candidate resource.

14. An apparatus for performing backscatter communication, the apparatus comprising a processor at least configured to:
receive a first excitation signal from a first device;
determine a first resource based on a candidate resource; wherein the first resource is a frequency domain resource, wherein:
the candidate resource is a frequency domain resource;
the first resource is determined based on a first offset step and a first factor, wherein the first offset step is a frequency offset step, and the frequency offset step is greater than or equal to bandwidth of the first excitation signal, and wherein determination of the first resource comprises multiplication of the first offset step and the first factor; and
the determination of the first resource based on the candidate resource includes: selection the first resource from candidate resources;
wherein, when the first factor for determination of the first resource is a default value or a preset value, the candidate resources comprise candidate offset steps, the selection of the first resource from candidate resources comprises selection of one of the candidate offset steps as the first offset step according to a rule that is configured to enable different scatter devices to select different offset steps;
wherein, when the first offset step for determination of the first resource is a default value or a preset value, the candidate resources comprise candidate factors, the selection of the first resource from candidate resources comprises selection of one of the candidate factors as the first factor according to a rule that is configured to enable different scatter devices to select different factors;
wherein when the candidate resources comprise candidate offset steps and candidate factors, the selection of the first resource from candidate resources comprises at least one of: (i) selection of one of the candidate factors as the first factor according to a rule that is configured to enable different scatter devices to select different factors or (ii) selection of one of the candidate offset steps as the first offset step according to the rule that is configured to enable different scatter devices to select different offset steps; and
send a backscattered signal of the first excitation signal to a second device based on the first resource.

15. The apparatus according to claim 14, wherein the first excitation signal is a pseudo-random signal.

16. The apparatus according to claim 14, wherein the processor is further configured to receive clock information from the first device.

17. The apparatus according to claim 14, wherein the processor is further configured to:
receive a first resource configuration from the first device;
receive a second excitation signal from the first device, and send a first identifier of a third device to the second device on a resource indicated by the first resource configuration; and
receive an access acknowledgment message from the first device, wherein the access acknowledgment message comprises a second identifier allocated to the third device by the first device or the second device.

18. The apparatus according to claim 14, wherein the processor is further configured to:
receive a second resource configuration from the first device, wherein the second resource configuration is used to indicate the candidate resource.

* * * * *